(12) United States Patent
Satoh et al.

(10) Patent No.: US 8,748,041 B2
(45) Date of Patent: Jun. 10, 2014

(54) POSITIVE ELECTRODE ACTIVE MATERIAL FOR LITHIUM ION BATTERY

(75) Inventors: Hirohito Satoh, Kitaibaraki (JP); Yoshio Kajiya, Kitaibaraki (JP); Ryuichi Nagase, Kitaibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 292 days.

(21) Appl. No.: 13/258,120

(22) PCT Filed: Mar. 3, 2010

(86) PCT No.: PCT/JP2010/053443
§ 371 (c)(1),
(2), (4) Date: Oct. 25, 2011

(87) PCT Pub. No.: WO2010/113583
PCT Pub. Date: Oct. 7, 2010

(65) Prior Publication Data
US 2012/0034525 A1    Feb. 9, 2012

(30) Foreign Application Priority Data
Mar. 31, 2009    (JP) ................. 2009-088365

(51) Int. Cl.
*H01M 4/13* (2010.01)
*H01M 4/50* (2010.01)
*H01M 4/00* (2006.01)

(52) U.S. Cl.
USPC ........ 429/224; 429/218.1; 429/220; 429/221; 429/231.5; 429/231.6; 250/340

(58) Field of Classification Search
None
See application file for complete search history.

(56) References Cited

U.S. PATENT DOCUMENTS

| 4,469,654 A | 9/1984 | Haskett et al. |
| 5,393,622 A | 2/1995 | Nitta et al. |

(Continued)

FOREIGN PATENT DOCUMENTS

| CN | 101478044 A | 7/2009 |
| EP | 0903796 A1 | 3/1999 |

(Continued)

OTHER PUBLICATIONS

International Preliminary Report on Patentability dated Nov. 17, 2011 in corresponding PCT application PCT/JP2010/053443.

(Continued)

*Primary Examiner* — Ula C Ruddock
*Assistant Examiner* — Matthew Van Oudenaren
(74) *Attorney, Agent, or Firm* — Nields, Lemack & Frame, LLC (57) ABSTRACT

Disclosed is a positive electrode active material that provides an improved capacity density. Specifically disclosed is a positive electrode active material for a lithium ion battery with a layered structure represented by $Li_x(Ni_yM_{1-y})O_z$ (wherein M represents at least one element selected from a group consisting of Mn, Co, Mg, Al, Ti, Cr, Fe, Cu, and Zr; x is in the range from 0.9 to 1.2; y is in the range from 0.3 to 0.95; and z is in the range from 1.8 to 2.4), wherein, when a value obtained by dividing an average of peak intensities observed between 1420 and 1450 $cm^{-1}$ and between 1470 and 1500 $cm^{-1}$ by the maximum intensity of a peak appearing between 520 and 620 $cm^{-1}$ in an infrared absorption spectrum obtained by FT-IR is represented by A, A satisfies the following relational formula: $0.20y-0.05 \leq A \leq 0.53y-0.06$.

5 Claims, 3 Drawing Sheets

(56) References Cited

U.S. PATENT DOCUMENTS

| | | | |
|---|---|---|---|
| 5,478,674 | A | 12/1995 | Miyasaka |
| 6,123,911 | A | 9/2000 | Yamaguchi et al. |
| 6,423,447 | B1 | 7/2002 | Ohsaki et al. |
| 6,582,854 | B1 | 6/2003 | Qi et al. |
| 6,984,469 | B2 | 1/2006 | Kweon et al. |
| 7,410,728 | B1 | 8/2008 | Fujimoto et al. |
| 8,623,551 | B2 | 1/2014 | Kawahashi et al. |
| 2002/0106561 | A1 | 8/2002 | Lee et al. |
| 2003/0082448 | A1 | 5/2003 | Cho et al. |
| 2003/0211391 | A1 | 11/2003 | Cho et al. |
| 2004/0110063 | A1 | 6/2004 | Uchitomi et al. |
| 2005/0079416 | A1 | 4/2005 | Ohzuku et al. |
| 2005/0142442 | A1 | 6/2005 | Yuasa et al. |
| 2005/0158546 | A1 | 7/2005 | Shizuka |
| 2006/0083989 | A1 | 4/2006 | Suhara et al. |
| 2006/0121350 | A1 | 6/2006 | Kajiya et al. |
| 2006/0127765 | A1 | 6/2006 | Machida et al. |
| 2006/0204849 | A1 | 9/2006 | Saito et al. |
| 2006/0281005 | A1 | 12/2006 | Cho et al. |
| 2007/0015058 | A1 | 1/2007 | Takezawa et al. |
| 2007/0141469 | A1 | 6/2007 | Tokunaga et al. |
| 2008/0044736 | A1 | 2/2008 | Nakura |
| 2008/0081258 | A1 | 4/2008 | Kim et al. |
| 2009/0117464 | A1 | 5/2009 | Cho et al. |
| 2009/0117469 | A1 | 5/2009 | Hiratsuka et al. |
| 2009/0148772 | A1 | 6/2009 | Kawasato et al. |
| 2009/0233176 | A1* | 9/2009 | Kita et al. ................. 429/231.95 |
| 2009/0289218 | A1 | 11/2009 | Kajiya et al. |
| 2009/0299922 | A1 | 12/2009 | Malcus et al. |
| 2010/0015514 | A1 | 1/2010 | Miyagi et al. |
| 2010/0019194 | A1 | 1/2010 | Fujiwara et al. |
| 2010/0112447 | A1 | 5/2010 | Yamamoto et al. |
| 2010/0143583 | A1 | 6/2010 | Honda et al. |
| 2010/0183922 | A1 | 7/2010 | Cho et al. |
| 2010/0209757 | A1 | 8/2010 | Ooyama et al. |
| 2010/0209771 | A1 | 8/2010 | Shizuka et al. |
| 2011/0031437 | A1 | 2/2011 | Nagase et al. |
| 2011/0250499 | A1 | 10/2011 | Hiratsuka |
| 2012/0231342 | A1 | 9/2012 | Satoh et al. |
| 2012/0231343 | A1 | 9/2012 | Nagase et al. |
| 2012/0244434 | A1 | 9/2012 | Nagase |
| 2012/0292562 | A1 | 11/2012 | Kajiya et al. |
| 2012/0319036 | A1 | 12/2012 | Kajiya et al. |
| 2012/0319037 | A1 | 12/2012 | Kawahashi et al. |
| 2012/0319039 | A1 | 12/2012 | Satoh et al. |
| 2012/0319040 | A1 | 12/2012 | Okamoto et al. |
| 2012/0321956 | A1 | 12/2012 | Kawahashi et al. |
| 2012/0326080 | A1 | 12/2012 | Okamoto et al. |
| 2012/0326098 | A1 | 12/2012 | Satoh |
| 2012/0326099 | A1 | 12/2012 | Satoh |
| 2012/0326101 | A1 | 12/2012 | Satoh |
| 2012/0326102 | A1 | 12/2012 | Satoh |
| 2013/0001463 | A1 | 1/2013 | Okamoto et al. |
| 2013/0004849 | A1 | 1/2013 | Satoh |
| 2013/0043428 | A1 | 2/2013 | Kawahashi et al. |
| 2013/0143121 | A1 | 6/2013 | Kobayashi et al. |
| 2013/0175470 | A1 | 7/2013 | Kajiya et al. |
| 2013/0221271 | A1 | 8/2013 | Nagase et al. |
| 2013/0316239 | A1 | 11/2013 | Okamoto |

FOREIGN PATENT DOCUMENTS

| | | |
|---|---|---|
| EP | 1244164 A1 | 9/2002 |
| EP | 1391950 A1 | 2/2004 |
| EP | 2207226 A1 | 7/2010 |
| EP | 2207227 A1 | 7/2010 |
| JP | 4-328277 A | 11/1992 |
| JP | 7-29603 A | 1/1995 |
| JP | 7-211311 A | 8/1995 |
| JP | 8-138669 A | 5/1996 |
| JP | 10-83815 A | 3/1998 |
| JP | 10-116618 A | 5/1998 |
| JP | 10-188986 A | 7/1998 |
| JP | 10-206322 A | 8/1998 |
| JP | 10-208744 A | 8/1998 |
| JP | 10-302779 A | 11/1998 |
| JP | 10-321224 A | 12/1998 |
| JP | 11-67205 A | 3/1999 |
| JP | 11-292542 A | 10/1999 |
| JP | 11-307094 A | 11/1999 |
| JP | 11-345615 A | 12/1999 |
| JP | 2000-72445 A | 3/2000 |
| JP | 2000-149945 A | 5/2000 |
| JP | 2000-215884 A | 8/2000 |
| JP | 2001-110420 A | 4/2001 |
| JP | 2001-148249 A | 5/2001 |
| JP | 2001-223008 A | 8/2001 |
| JP | 2001-266851 A | 9/2001 |
| JP | 2002-63901 A | 2/2002 |
| JP | 2002-164053 A | 6/2002 |
| JP | 2002-203552 A | 7/2002 |
| JP | 2002-216745 A | 8/2002 |
| JP | 2002-260655 A | 9/2002 |
| JP | 2002-298914 A | 10/2002 |
| JP | 3334179 B2 | 10/2002 |
| JP | 2003-7299 A | 1/2003 |
| JP | 2003-17052 A | 1/2003 |
| JP | 2003-81637 A | 3/2003 |
| JP | 2003-151546 A | 5/2003 |
| JP | 2004-6264 A | 1/2004 |
| JP | 2004-193115 A | 7/2004 |
| JP | 2004-227790 A | 8/2004 |
| JP | 2004-355824 A | 12/2004 |
| JP | 2005-11713 A | 1/2005 |
| JP | 2005-53764 A | 3/2005 |
| JP | 2005-56602 A | 3/2005 |
| JP | 2005-60162 A | 3/2005 |
| JP | 2005-75691 A | 3/2005 |
| JP | 2005-183366 A | 7/2005 |
| JP | 2005-235624 A | 9/2005 |
| JP | 2005-243636 A | 9/2005 |
| JP | 2005-285572 A | 10/2005 |
| JP | 2005-289700 A | 10/2005 |
| JP | 2005-302507 A | 10/2005 |
| JP | 2005-302628 A | 10/2005 |
| JP | 2005-324973 A | 11/2005 |
| JP | 2005-332707 A | 12/2005 |
| JP | 2005-347134 A | 12/2005 |
| JP | 2006-4724 A | 1/2006 |
| JP | 2006-19310 A | 1/2006 |
| JP | 2006-54159 A | 2/2006 |
| JP | 2006-107818 A | 4/2006 |
| JP | 2006-107845 A | 4/2006 |
| JP | 2006-127923 A | 5/2006 |
| JP | 2006-127955 A | 5/2006 |
| JP | 2006-134852 A | 5/2006 |
| JP | 2006-156126 A | 6/2006 |
| JP | 2006-156235 A | 6/2006 |
| JP | 2006-164758 A | 6/2006 |
| JP | 2006-286614 A | 10/2006 |
| JP | 3835266 B2 | 10/2006 |
| JP | 2006-351379 A | 12/2006 |
| JP | 2007-48744 A | 2/2007 |
| JP | 2007-95443 A | 4/2007 |
| JP | 2007-194202 A | 8/2007 |
| JP | 2007-214138 A | 8/2007 |
| JP | 2007-226969 A | 9/2007 |
| JP | 2007-227368 A | 9/2007 |
| JP | 2007-257890 A | 10/2007 |
| JP | 2007-280723 A | 10/2007 |
| JP | 2008-13405 A | 1/2008 |
| JP | 4070585 B2 | 4/2008 |
| JP | 2008-103132 A | 5/2008 |
| JP | 2008-181708 A | 8/2008 |
| JP | 2008-192547 A | 8/2008 |
| JP | 2008-266136 A | 11/2008 |
| JP | 2008-277106 A | 11/2008 |
| JP | 4175026 B2 | 11/2008 |
| JP | 2008-544468 A | 12/2008 |
| JP | 2009-117365 A | 5/2009 |
| JP | 2009-135070 A | 6/2009 |
| JP | 2009-151959 A | 7/2009 |
| JP | 4287901 B2 | 7/2009 |

(56) References Cited

FOREIGN PATENT DOCUMENTS

| JP | 2009-289726 A | 12/2009 |
| --- | --- | --- |
| JP | 2010-15959 A | 1/2010 |
| JP | 2010-47466 A | 3/2010 |
| JP | 2010-192200 A | 9/2010 |
| JP | 2011-44364 A | 3/2011 |
| TW | 363940 | 7/1999 |
| WO | 02/086993 A1 | 10/2002 |
| WO | 2004/064180 A1 | 7/2004 |
| WO | WO 2007072759 * | 6/2007 |
| WO | 2008/084679 A1 | 7/2008 |
| WO | 2009/011157 A1 | 1/2009 |
| WO | 2009/060603 A1 | 5/2009 |
| WO | 2009/128289 A1 | 10/2009 |
| WO | 2010/049977 A1 | 5/2010 |
| WO | 2010/113512 A1 | 10/2010 |
| WO | 2010/113583 A1 | 10/2010 |
| WO | 2011/065391 A1 | 6/2011 |
| WO | 2011/108720 A1 | 9/2011 |

OTHER PUBLICATIONS

International Search Report mailed May 24, 2011 in co-pending PCT application No. PCT/JP2011/053271.
International Search Report/Written Opinion mailed Mar. 8, 2011 in co-pending PCT application No. PCT/JP2010/071723.
International Preliminary Report on Patentability mailed Jul. 12, 2012 in co-pending PCT application No. PCT/JP2010/071723.
International Search Report/Written Opinion mailed Jan. 25, 2011 in co-pending PCT application No. PCT/JP2010/071724.
International Preliminary Report on Patentability issued Jul. 10, 2012 in co-pending PCT application No. PCT/JP2010/071724.
International Search Report mailed Jun. 8, 2010 in corresponding PCT application No. PCT/JP2010/053443.
Office Action mailed Jun. 10, 2013 in co-pending U.S. Appl. No. 13/508,887.
Office Action mailed Jul. 16, 2013 in co-pending U.S. Appl. No. 13/514,080.
Office Action mailed Jul. 29, 2013 in co-pending U.S. Appl. No. 13/576,548.
Office Action mailed Aug. 1, 2013 in co-pending U.S. Appl. No. 13/581,546.
Office Action mailed Jul. 17, 2013 in co-pending U.S. Appl. No. 13/581,814.
Office Action mailed Jun. 19, 2013 in co-pending U.S. Appl. No. 13/582,096.
Office Action mailed Jul. 12, 2013 in co-pending U.S. Appl. No. 13/582,101.
Office Action mailed Jul. 15, 2013 in co-pending U.S. Appl. No. 13/582,113.
Office Action mailed Aug. 13, 2013 in co-pending U.S. Appl. No. 13/582,067.
International Preliminary Report on Patentability mailed Nov. 22, 2012 in co-pending PCT application No. PCT/JP2011/054938.
International Preliminary Report on Patentability mailed Nov. 22, 2012 in co-pending PCT application No. PCT/JP2011/055111.
International Search Report mailed Nov. 1, 2011 in co-pending PCT application No. PCT/JP2011/066722.
International Search Report mailed Apr. 10, 2012 in co-pending PCT application No. PCT/JP2011/079535.
Office Action—Restriction—mailed Mar. 12, 2013 in co-pending U.S. Appl. No. 13/508,887.
Office Action mailed Mar. 13, 2013 in co-pending U.S. Appl. No. 13/582,091.
International Search Report mailed Jan. 24, 2012 in co-pending PCT application No. PCT/JP2011/072860.
International Search Report mailed Apr. 26, 2011 in co-pending PCT application No. PCT/JP2011/052394.
International Preliminary Report on Patentability mailed Oct. 11, 2012 in co-pending PCT application No. PCT/JP2011/052394.

International Search Report mailed May 10, 2011 in co-pending PCT application No. PCT/JP2011/052399.
International Preliminary Report on Patentability mailed Oct. 11, 2012 in co-pending PCT application No. PCT/JP2011/052399.
International Search Report mailed Nov. 15, 2011 in co-pending PCT application No. PCT/JP2011/069042.
International Search Report/Written Opinion mailed Jun. 7, 2011 in co-pending PCT application No. PCT/JP2011/054935.
International Preliminary Report on Patentability mailed Oct. 11, 2012 in co-pending PCT application No. PCT/JP2011/054935.
International Search Report mailed Jun. 7, 2011 in co-pending PCT application No. PCT/JP2011/054938.
International Search Report/Written Opinion mailed May 17, 2011 in co-pending PCT application No. PCT/JP2011/054942.
International Preliminary Report on Patentability issued Oct. 2, 2012 in co-pending PCT application No. PCT/JP2011/054942.
International Search Report/Written Opinion mailed Jun. 7, 2011 in co-pending PCT application No. PCT/JP2011/054934.
International Preliminary Report on Patentability mailed Oct. 11, 2012 in co-pending PCT application No. PCT/JP2011/054934.
International Search Report/Written Opinion mailed May 17, 2011 in co-pending PCT application No. PCT/JP2011/054941.
International Preliminary Report on Patentability issued Oct. 2, 2012 in co-pending PCT application No. PCT/JP2011/054941.
International Search Report mailed May 10, 2011 in co-pending PCT application No. PCT/JP2011/055111.
International Search Report/Written Opinion mailed May 17, 2011 in co-pending PCT application No. PCT/JP2011/053710.
International Preliminary Report on Patentability issued Oct. 2, 2012 in co-pending PCT application No. PCT/JP2011/053710.
International Search Report/Written Opinion mailed May 24, 2011 in co-pending PCT application No. PCT/JP2011/054777.
International Preliminary Report on Patentability issued Oct. 2, 2012 in co-pending PCT application No. PCT/JP2011/054777.
International Search Report mailed May 24, 2011 in co-pending PCT application No. PCT/JP2011/054781.
Written Opinion mailed Jun. 24, 2011 in co-pending PCT application No. PCT/JP2011/054781.
International Preliminary Report on Patentability mailed Oct. 11, 2012 in co-pending PCT application No. PCT/JP2011/054781.
International Search Report/Written Opinion mailed May 24, 2011 in co-pending PCT application No. PCT/JP2011/054779.
International Preliminary Report on Patentability mailed Oct. 2, 2012 in co-pending PCT application No. PCT/JP2011/054779.
Electrochimica Acta, vol. 51, 2006, pp. 5581-5586, "Preparation and electrochemical properties of $LiCoO_2$—$LiNi0.5Mn0.5O_2$—$Li_2MnO_3$ solid solutions with high Mn contents", Sun, et al.
International Preliminary Report on Patentability mailed Sep. 26, 2013 in co-pending PCT application No. PCT/JP2011/053271.
International Preliminary Report on Patentability mailed Oct. 10, 2013 in co-pending PCT application No. PCT/JP2011/072860.
International Preliminary Report on Patentability mailed Aug. 1, 2013 in co-pending PCT application No. PCT/JP2011/069042.
Japanese Communication mailed Oct. 1, 2013 in co-pending Japanese patent application No. JP 2012-503253.
Japanese Communication mailed Oct. 1, 2013 in co-pending Japanese patent application No. JP 2012-503255.
Japanese Communication mailed Oct. 1, 2013 in co-pending Japanese patent application No. JP 2012-503252.
International Preliminary Report on Patentability mailed Jun. 13, 2013 in co-pending PCT application No. PCT/JP2011/066722.
International Search Report mailed Jun. 5, 2012 in co-pending PCT application No. PCT/JP2012/057974.
International Journal of Inorganic Materials 3 (2001), pp. 323-329, "Structural and electrochemical properties of Li—Ni—Co oxides synthesized by wet chemistry via a succinic-acid-assisted technique", Castro-Garcia, et al.
Final Rejection mailed Sep. 19, 2013 in co-pending U.S. Appl. No. 13/508,887.
Office Action mailed Sep. 17, 2013 in co-pending U.S. Appl. No. 13/856,514.

(56) References Cited

OTHER PUBLICATIONS

International Preliminary Report on Patentability mailed Oct. 10, 2013 in co-pending PCT application No. PCT/JP2012/057974.
Office Action mailed Dec. 4, 2013 in co-pending U.S. Appl. No. 13/508,880.
Office Action mailed Dec. 18, 2013 in co-pending U.S. Appl. No. 13/514,080.
Final Rejection mailed Jan. 9, 2014 in co-pending U.S. Appl. No. 13/576,548.
Notice of Allowance mailed Nov. 6, 2013 in U.S. Appl. No. 13/582,091 (now US Patent No. 8,623,551.

* cited by examiner

POSITIVE ELECTRODE ACTIVE MATERIAL FOR LITHIUM ION BATTERY

TECHNICAL FIELD

The present invention relates to a positive electrode active material for a lithium ion battery. Further, the present invention also relates to a method for evaluating the properties of said positive electrode active material.

BACKGROUND ART

A lithium ion battery is a secondary battery having characteristics that the energy density thereof is high, and therefore a relatively high voltage can be obtained, and thus, it is frequently used in small electronic equipments such as a note-type personal computer, a video camera, a digital camera, a mobile phone, and the like. It is also expected that in the future, it may be used as a power source for large apparatuses such as an electric car and a dispersed-type power supply for household use.

As a positive electrode active material for using in a lithium ion battery, composite oxides of lithium and transition metals such as $LiCoO_2$, $LiNiO_2$ and $LiMnO_2$ having a layered structure and $LiMn_2O_4$ having a spinel structure are representative. Various studies are being performed in order to improve the properties required for the positive electrode active material such as a capacity density, charge and discharge cycle durability, and safety.

In developing a novel positive electrode active material, establishing a means by which the properties of the positive electrode active material can be easily evaluated is indispensable. So far, attempts to improve the positive electrode active material has been done by evaluating the properties thereof on the basis of the infrared absorption spectrum obtained by FT-IR. According to this method, the properties of the positive electrode active material can be evaluated without actually assembling the lithium ion battery and determining the battery's properties, and thus it is useful for shortening the term of development and simplifying the screening test.

For example, Japanese Patent Application Publication No. 2005-56602 (Patent Document 1) discloses that with regard to lithium-cobalt composite oxide powder, the properties as the material for positive electrode of a lithium secondary battery can be evaluated with high accuracy by detecting each of absorbance around 1450 $cm^{-1}$ and 1030 $cm^{-1}$ of wavenumber with a diffused reflection type Fourier transform infrared spectrophotometer, and determining whether the ratio of said absorbencies is within a particular range or not, and that the lithium-cobalt composite oxide powder for positive electrode of the lithium secondary battery which satisfies all of high capacity density, high safety, and high charge and discharge cycle durability is obtained by controlling the ratio of the absorbencies around wave-number of 1450 $cm^{-1}$ and 1030 $cm^{-1}$ so that it will be 0.2 or less.

Patent Document 1 further discloses that this means that the existing amount of lithium carbonate, which is a residual alkali, is relatively small in the invention described in Patent Document 1 since each of spectrum absorbance at the wavenumber of 1450 $cm^{-1}$ and 1030 $cm^{-1}$ indicates the existing amount of lithium carbonate and lithium cobaltate, respectively. It is also disclosed that when the residual alkali exists on the surface of the positive electrode material, oxidation reaction of the electrolyte on the positive electrode is accelerated, and as the result, a film layer with high impedance is formed on the surface of the positive electrode material, and thus, homogenous insertion and release of lithium becomes difficult, causing irreversible collapse of the crystal structure of lithium cobalate as the charge and discharge cycle proceeds.

Japanese Patent Application Publication No. 10-83815 (Patent Document 2) also describes a harmful influence caused by lithium carbonate. It is disclosed that when a large quantity of lithium carbonate remains, the lithium carbonate degrades the electrolyte in some mechanism and thus gas is generated which increases the inner pressure of the battery so that the battery will swell and the properties thereof will be degraded.

In Japanese Patent Application Publication No. 2005-289700 (Patent Document 3), the distance between peak A appeared around 570-595 $cm^{-1}$ and peak B around 520-550 $cm^{-1}$ (difference $\Delta$) was noted in the infrared absorption spectrum (FT-IR) of lithium-transition metals oxide, and the lithium-transition metals oxides having the bonding structure where the difference $\Delta$ is equal to or less than 50 $cm^{-1}$ are described.

PRIOR ART DOCUMENTS

Patent Documents

Patent Document 1: Japanese Patent Appln Publication No. 2005-56602

Patent Document 2: Japanese Patent Appln Publication No. 10-83815

Patent Document 3: Japanese Patent Appln Publication No. 2005-289700

SUMMARY OF INVENTION

Problems to be Solved by the Invention

As described above, it has been known that lithium carbonate remained in a positive electrode active material for a lithium ion battery has a harmful influence to the battery properties. And much effort has been made to eliminate it as much as possible. Further, the existing amount of lithium carbonate contained in the positive electrode active material has been evaluated by absorption spectrum using FT-IR. However, the properties of the positive electrode active material have yet room for improvement.

Thus, the problem to be solved by the present invention is to find a novel means for evaluating the properties of a positive electrode active material for a lithium ion battery, and provide the positive electrode active material which allows an improved capacity density of battery on the basis of said means. Further, another problem to be solved by the present invention is to provide a positive electrode for a lithium ion battery. Further, yet another problem to be solved by the present invention is to provide a lithium ion battery in which said positive electrode for lithium ion battery is used.

Means for Solving the Problem

The inventors of the present invention have eagerly studied, with regard to the positive electrode active material comprised of composite oxide containing lithium, nickel and other metals, the relationship between the remained lithium carbonate and the capacity density of the lithium ion battery. As a result, the inventors have found that the capacity density of battery certainly increases as the excess lithium carbonate is decreased but when the lithium carbonate is further decreased, the capacity density of battery decreases after passing a certain point which makes a peak of the capacity density of battery.

Figure 1:
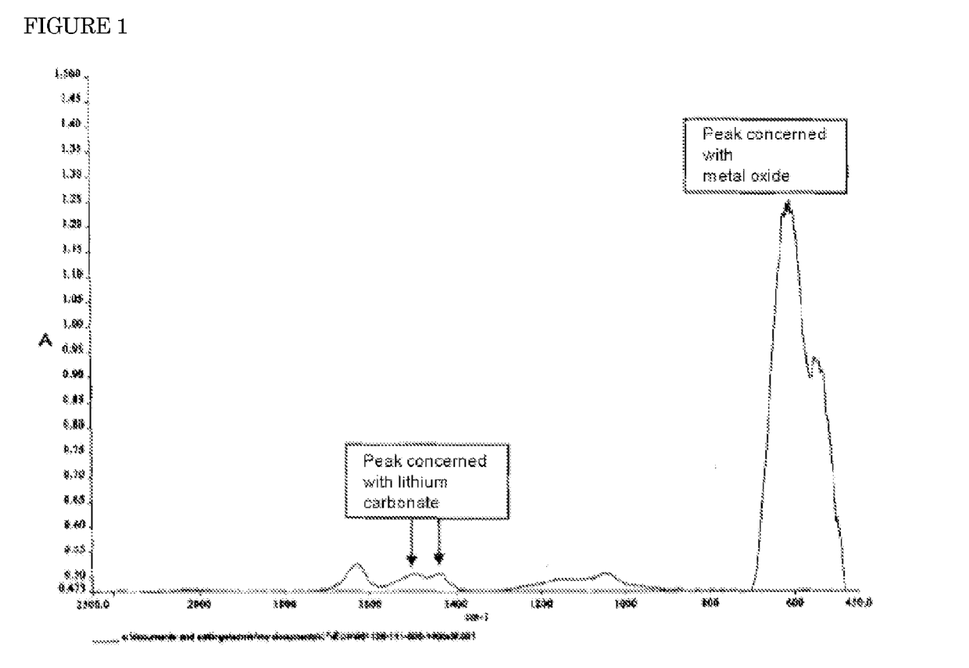
FIG. 1 This is a figure which indicates an example of infrared absorption spectrum obtained by FT-IR with regard to lithium composite oxide.

Further, with regard to infrared absorption spectrum obtained by FT-IR, we have found that the ratio of the peak intensity concerned with lithium carbonate ($Li_2CO_3$), which is observed at 1420-1450 $cm^{-1}$ and 1470-1500 $cm^{-1}$, to the peak intensity concerned with metal oxide, which is observed at 520-620 $cm^{-1}$, (hereafter, referred to as "peak ratio") is useful for evaluating the state of the remained lithium carbonate (see FIG. 1). The peak concerned with metal oxide also includes the peak concerned with lithium oxide, and thus, it serves as an indicator for the existing form of lithium in the composite oxide.

Further, the inventors have ascertained that the peak ratio at which the maximum capacity density of battery is achieved is also affected by the existing ratio of nickel co-existing in the composite oxide, and thus found the relationship between the atomic ratio of nickel to the total of nickel and other metals and the optimal peak ratio. It was revealed that in general, the higher the atomic ratio of nickel is, the higher the optimal lithium ratio also becomes, namely, the ratio of lithium carbonate to be remained increases. Moreover, it came out that the when the atomic ratio of nickel gets high, the capacity density of battery obtained tends to increase.

The present invention has been completed on the basis of the above-described knowledge provides, in one aspect, a positive electrode active material for a lithium ion battery, said active material having a layered structure represented by the following compositional formula:

$$Li_x(Ni_yM_{1-y})O_z$$

in which M is one or more selected from the group consisting of Mn, Co, Mg, Al, Ti, Cr, Fe, Cu and Zr, x is within the range of 0.9-1.2, y is within the range of 0.3-0.95 and z is within the range of 1.8-2.4
wherein when A is defined as a value which is obtained by dividing an average of the peak intensities observed at 1420-1450 $cm^{-1}$ and 1470-1500 $cm^{-1}$ by a maximum peak intensity which appears at 520-620 $cm^{-1}$ in an infrared absorption spectrum obtained by FT-IR, A satisfies the following relational formula:

$$0.20y-0.05 \leq A \leq 0.53y-0.06.$$

In an embodiment of the positive electrode active material for a lithium ion battery according to the present invention, A satisfies the following relational formula:

$$0.24y-0.05 \leq A \leq 0.48y-0.08.$$

In another embodiment of the positive electrode active material for a lithium ion battery according to the present invention, y is within the range of 0.5-0.95.

In yet another embodiment of the positive electrode active material for a lithium ion battery according to the present invention, M is one or two selected from Mn and Co.

In another aspect, the present invention provides a positive electrode for a lithium ion battery comprising said positive electrode active material for a lithium ion battery.

In a further aspect, the present invention provides a lithium ion battery comprising said positive electrode for a lithium ion battery.

In a further aspect, the present invention provides a method for evaluating a positive electrode active material for a lithium ion battery, said active material having a layered structure represented by the following compositional formula:

$$Li_x(Ni_yM_{1-y})O_z$$

in which M is one or more selected from the group consisting of Mn, Co, Mg, Al, Ti, Cr, Fe, Cu and Zr, x is within the range of 0.9-1.2, y is within the range of 0.3-0.95 and z is within the range of 1.8-2.4
wherein when A is defined as a value which is obtained by dividing an average of the peak intensities observed at 1420-1450 $cm^{-1}$ and 1470-1500 $cm^{-1}$ by a maximum peak intensity which appears at 520-620 $cm^{-1}$ in an infrared absorption spectrum obtained by FT-IR, the method comprises determining whether A is within a preset range or not.

Effect of the Invention

The capacity density of a lithium ion battery can be increased by applying the positive electrode active material related to the present invention to the positive electrode. Further, according to the present invention, the properties of the positive electrode active material can be evaluated without actually producing the lithium ion battery, and therefore the present invention may contribute to quality control in a production line and speedup of research and development of the positive electrode active material.

DETAILED DESCRIPTION OF THE PREFERRED EMBODIMENTS

Composition

The positive electrode active material for a lithium ion battery related to the present invention is a composite oxide having a layered structure represented by the following compositional formula.

$$Li_x(Ni_yM_{1-y})O_z$$

in which M is one or more selected from the group consisting of Mn, Co, Mg, Al, Ti, Cr, Fe, Cu and Zr, x is within the range of 0.9-1.2, y is within the range of 0.3-0.95 and z is within the range of 1.8-2.4.

The composite oxide has basically a composition in which nickel is partially replaced by other metal element(s) M in lithium nickelate ($LiNiO_2$). The reason why the above metal elements were selected as M is due to safety, structural stability and the like. Above all, due to capacity generation property, either or both of Mn and Co are preferably used as M. More preferably, both of Mn and Co are used.

Though impurities other than the intended element(s) may be included in the composite oxide in some cases, the impurities have little influence on the properties when the total amount of the impurities is 1000 mass ppm or less. Therefore, even when such a small amount of the impurities are included in the composite oxide, it is within the range of the present invention.

In the formula, x represents the degree of excess and deficiency of Li. While x is ideally 1.0, the excess and deficiency to some degree is allowable. However, when x is less than 0.9, the layered structure cannot be kept and when x is more than 1.2, the excessive lithium forms an another compound which does not function as an active material. Therefore, x is within the range of 0.9-1.2, preferably 0.95-1.15, and more preferably 0.98-1.11. Controlling x can be performed by regulating the amount of lithium source when the positive electrode active material is produced.

"y" represents the proportion of Ni in the metal elements. When y is less than 0.3, sufficient capacity will not be obtained. On the other hand, when y is more than 0.95, heat stability will decrease. Therefore, y is within the range of 0.3-0.95. For obtaining a high capacity density of battery, y is preferably 0.5-0.95, and more preferably 0.6-0.8. Controlling y can be performed by regulating the amount of substituent metal source when the positive electrode active material is produced.

"z" represents the degree of excess and deficiency of oxygen (O). Ideally, z is 2.0. However, actually, the deficiency or excess sometimes partially occurs, and the excess or deficiency to some degree is allowable. However, when z is less than 1.8, the structure will be unstable, and when z is more than 2.4, a heterogenous phase will be generated in crystal. Therefore, z is within the range of 1.8-2.4, preferably 1.9-2.4, and more preferably 2.0-2.4.

In the present invention, the composition is determined by quantitative analysis of each element of material (Li, Ni, Mn and the like) using ICP-MS (ICP mass spectrometer).

Peak Ratio

It is thought that when lithium carbonate as a remained alkaline component is exposed on the surface of the positive electrode active material, the properties of battery will be deteriorated. Further, it may also cause the problem of gelation during the production of the electrode. Therefore, in the past, a great deal of effort has been spent to decrease it. On the contrary, in the present invention, it is intended to improve the performance of the lithium ion battery, especially its capacity density by leaving a certain degree of lithium carbonate in the composite oxide constituting the positive electrode material. The capacity density of battery increases as the excess lithium carbonate is decreased. However, the capacity density of battery decreases after passing a certain point which makes a peak of the capacity density of battery. Further, it is thought that the excess lithium carbonate also contributes to the structural stability of the composite oxide.

The amount of lithium carbonate remained in the composite oxide can be evaluated using the ratio of the peak intensity concerned with lithium carbonate ($Li_2CO_3$), which is observed at 1420-1450 $cm^{-1}$ and 1470-1500 $cm^{-1}$ in an infrared absorption spectrum obtained by FT-IR, to the peak intensity concerned with metal oxide including lithium oxide, which is observed at 520-620 $cm^{-1}$, as an indicator. The position of the peak intensity sometimes may fall slightly outside the above range. In such case, the peak intensity is calculated on the basis of said peak intensity.

In evaluating the properties of composite oxide having said composition as the positive electrode active material for a lithium ion battery using the infrared absorption spectrum of FT-IR as an indicator, when A is defined as a value which is obtained by dividing an average of the peak intensities observed at 1420-1450 $cm^{-1}$ and 1470-1500 $cm^{-1}$ by the maximum peak intensity which appears at 520-620 $cm^{-1}$, it is required for obtaining a high capacity density of battery that A satisfies the following relational formula:

$$0.20y-0.05 \leq A \leq 0.53y-0.06.$$

Preferably, A satisfies the following relational formula:

$$0.24y-0.05 \leq A \leq 0.48y-0.08.$$

The reason why y, which represents the existing ratio of nickel, is involved in the formula is that the peak ratio at which the maximum capacity density of battery is achieved is also affected by the existing ratio of nickel co-existing in the composite oxide. In general, the higher the atomic ratio of nickel is, the higher the optimal lithium ratio also becomes, namely, the ratio of lithium carbonate to be remained increases. Moreover, as the atomic ratio of nickel gets high, the capacity density of battery obtained shows a tendency to increase. The above-described formula reflects this fact.

In the present invention, the determination of infrared absorption spectrum using FT-IR (Fourier transform infrared spectrophotometer) is carried out according to the following procedure. The positive electrode active material and KBr are mixed in a mortar at a weight ratio of 1:125 (e.g., 2 mg of the positive electrode active material and 250 mg of KBr). 60 mg of the mixed powder is placed in a pressing jig of φ 7 mm and then molded at a pressure of 200 kgf. The molded product is then subjected to FT-IR determination using a transmission method with 128 integration times.

Preparation Method

The method for preparing the composite oxide used in the present invention as a positive electrode active material is hereinafter explained.

In the present invention, a method in which a mixture or co-precipitate including lithium, nickel and a metal element M which replaces a part of nickel is oxidized can be used. The mixture can be prepared by mixing the compounds of each element using a common process. The co-precipitate can be also prepared by a common process (co-precipitation as hydroxide or carbonate).

Concretely, a raw material mixture is prepared by mixing each of raw materials so that metal elements which constitute the crystal of composite oxide would exist in the crystal structure at the aimed compositional rate. The raw material includes lithium compounds, nickel compounds and the compounds of metal element M.

Lithium compounds include, but not limited to, lithium carbonate, lithium hydroxide, lithium oxide, lithium chloride, lithium nitrate, lithium sulfate, lithium hydrogencarbonate, lithium acetate, lithium fluoride, lithium bromide, lithium iodide, lithium peroxide. Among them, lithium carbonate is preferable because it can be handled easily and it is inexpensive.

Nickel compounds include, but not limited to, metal nickel, nickel oxide, nickel hydroxide, nickel nitrate, nickel carbonate, nickel chloride, nickel iodide, nickel sulfate. Among them, nickel chloride and nickel sulfate are preferable because they can be easily mixed, and easily co-precipitated (high solubility in the solution).

In case where manganese is employed as a metal element M, manganese compounds include, but not limited to, metal manganese, manganese oxide, manganese hydroxide, manganese nitrate, manganese carbonate, manganese chloride, manganese iodide, manganese sulfate. Among them, manganese chloride and manganese sulfate are preferable, because they are easily mixed and easily co-precipitated (high solubility in the solution).

In case where cobalt is employed as a metal element M, cobalt compounds include, but not limited to, metal cobalt, cobalt oxide, cobalt hydroxide, cobalt nitrate, cobalt carbonate, cobalt chloride, cobalt iodide, cobalt sulfate. Among them, cobalt chloride and cobalt sulfate are preferable, because they are easily mixed and easily co-precipitated (high solubility in the solution).

In case where Mg, Al, Ti, Cr, Fe, Cu or Zr are employed as a metal element M, carbonate, nitrate, hydroxide, chloride, oxide and the like thereof can be used in the same way.

The method for mixing is hereinafter explained. The method for mixing includes, but not limited to a method wherein the raw material in powdery state is mixed as it is, and a method wherein the raw materials are dissolved or suspended in water and/or organic solvent before mixing. The latter is preferable because more homogenous mixing can be achieved.

A preferred embodiment of the latter is explained. Firstly, a suspension of lithium carbonate is prepared with pure water. The concentration of lithium carbonate in the suspension is preferably about 20-600 g/L depending on the amount for mixing. Subsequently, to the suspension of lithium carbonate, desired amount of aqueous solution of chloride of metal element such as nickel and cobalt is projected or dropped. The rate of projecting the aqueous solution of chloride is preferably adjusted so that the total addition amount added will be added for from 10 min to 20 hours, in order to control the size and shape of particle prepared. The temperature of fluid may be at room temperature or heated. Further, when aqueous solution of chloride is projected, stirring the suspension of lithium carbonate at 50-400 rpm is preferable, for the purpose of controlling the bonding state of particles. The rate of stirring is determined in accordance with the tank used. Carbonate having the desired particle size will be precipitated by regulating the projecting and stirring rate. The precipitate is harvested by filtration, and washed with the saturated aqueous solution of lithium carbonate in order to avoid dissolution of lithium carbonate, and thus, the raw material mixture (also referred to as "precursor of carbonate") is obtained.

By performing the oxidation treatment of the raw material mixture obtained under an appropriate condition (calcination in oxidizing atmosphere and the like), the lithium-manganese composite oxide according to the present invention is obtained, which is used as the positive electrode active material for the secondary lithium battery.

Oxidation treatment is preferably carried out by heating the temperature of the material to 800-1100° C. Li and metal will not become homogenous at less than 800° C., and oxygen deficiency increases and adverse change of properties such as decrease of capacity will be caused at over 1100° C. More preferably, heating temperature is 850-1050° C., Further, the retention time at said temperature is preferably 1-3 hours. Subsequently, cooling is performed. The cooling time from said temperature to 500° C. is preferably 4 hours or more, during which stabilization of crystal is intended, because rapid cooling causes a strain in the crystal. Further, oxygen-containing gas such as air or oxygen is preferably flowed continuously from the starting of heating of the raw material mixture through the calcination to cooling to the room temperature. This is because the deficiency of oxygen would be decreased when the precursor is oxidized during the calcination.

A method for adjusting the peak ratio is explained. The peak ratio is sensitive to a influence from a subtle change in the proportion of lithium and the calcination temperature. Therefore, it is necessary to establish carefully the condition for preparation. In general, as a method for increasing the peak ratio, increasing the addition amount of Li, reducing the calcination temperature, shortening the retention time for calcination and the like are mentioned. As a method for decreasing the peak ratio, reducing the addition amount of Li, raising the calcination temperature, extending the retention time of calcination and the like are mentioned. The peak ratio can be adjusted by combining these conditions.

The composite oxide obtained can be used as a positive electrode active material for a lithium ion battery, and a positive electrode for a lithium ion battery can be produced according to known means. For example, a positive mix is prepared by mixing a binder such as polyvinylidene fluoride, polytetrafluoroethylene or polyamide acrylic resin with a conductive material such as acetylene black, graphite and the like. Subsequently, the positive mix can be applied as a slurry onto a current collector such as aluminum foil and then pressed for producing the positive electrode. Further, by using the positive electrode according to the present invention, a lithium ion battery, particularly, a lithium ion secondary battery can be produced.

EXAMPLE

Examples are provided below, for better understanding of the present invention and the advantage thereof. However, the present invention is not limited to these Examples.

No. 1-26

A suspension of lithium carbonate was prepared by suspending the commercially available lithium carbonate of the weight described in Table 1 into 3.2 L of pure water. Subsequently, hydrated nickel chloride, manganese chloride and cobalt chloride were dissolved in pure water, with the compositional ratio Ni:Mn:Co described in Table 1, so that the total mole number of Ni, Mn and Co could be 14 mol. The total amount of the solution was adjusted to 4.8 L. To said suspension, said solution was projected at 1.6 L/hr, and thus, a carbonate (a mixture of lithium carbonate, nickel carbonate, manganese carbonate and cobalt carbonate) was obtained.

The carbonate was solid-liquid separated by filter press, and then washed with a saturated lithium carbonate solution and then dried. 3 kg of this double carbonate was charged into a sagger of 300 mm square and then heated to the temperature described in Table 1 for 2 hours using an oven of 125 L, and then kept for the retention time described in said Table, and then cooled to room temperature (provided that the cooling time to 500° C. was 4 hours or more), and thus, an oxide was obtained. The positive electrode active material was obtained by grinding it. From the start of elevating of temperature to the end of cooling, air was flowed at 10 L/min in No. 1-8, and oxygen was flowed at 10 L/min in No. 9-26.

(Composition)

Using ICP-MS (SII Nanotechnologies, SPQ-9100), contents of each element was determined, and thus composition (x, y, z) was determined. Further, it was confirmed, as the result of X ray diffraction (Rigaku K.K., RINT-1100), that all of the composite oxides obtained had a layered structure. The result was shown in Table 1.

(Peak Ratio)

The positive electrode active material and KBr were mixed in a mortar at weight ratio of 1:125 (e.g., 2 mg of the positive electrode active material and 250 mg of KBr). 60 mg of the mixed powder was placed in a pressing jig of φ 7 mm and then molded at a pressure of 200 kgf. The molded product was then subjected to FT-IR determination using a transmission method. The determination was performed using "Spectrum One" (Perkin Elmer) with 128 integration times. After determination, to the profiles obtained, an automatic correction of standard curve incorporated in the determining software was applied. After that, the peak ratio A was obtained by dividing an average of the peak intensities observed around 1420-1450 cm$^{-1}$ and 1470-1500 cm$^{-1}$ by the maximum peak intensity which appears around 520-620 cm$^{-1}$. The results were shown in Table 1.

(Evaluation of Battery)

The positive electrode active material, a conductive material (Denki Kagaku K.K., Denka black: HS-100), a binder (PVDF resin: Kureha K.K., KF-1100) were weighed at a weight ratio of 85:8:7. The binder was dissolved in an organic solvent (N-methylpyrrolidone) and then the positive electrode active material and the conductive material were added and mixed, and thus, a slurry was prepared. The slurry was applied onto Al foil and dried and then pressed, and thus, the positive electrode was obtained. A 2032 type coin cell in which an opposite electrode was Li was prepared for evaluation, and an initial discharge capacity was determined using 1M-LiPF$_6$ dissolved in EC-DMC (volumetric ratio 1:1) as electrolyte. The determination of the initial capacity was performed for charge and discharge at 0.2 C. The results were shown in Table 1.

Figure 5:
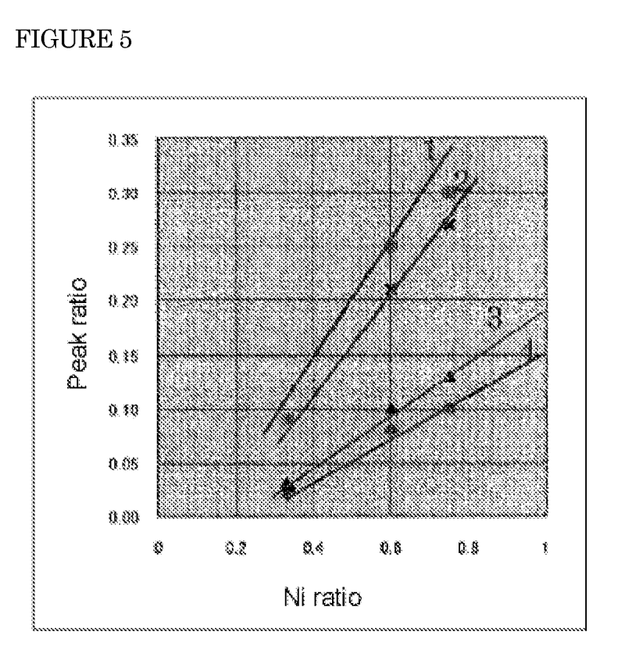
FIG. 5 This is a figure which indicates the relationship between the plots and the standard lines for evaluation where x axis represents Ni ratio (y) and y axis represents the peak ratio (A).

The Figure in which the above-described results are plotted where horizontal axis indicates Ni ratio (y) and vertical axis indicates peak ratio (A) is FIG. 5. In FIG. 5, four straight lines (1, 2, 3, 4) are additionally written. The region between line 1 and line 4 satisfies 0.20y−0.05≤A≤0.53y−0.06 and the discharge capacity density is high in said region. And the region between the line 2 and line 3 satisfies 0.24y−0.05≤A≤0.48y−0.08 and the discharge capacity density is higher in said region.

The invention claimed is:

1. A positive electrode active material for a lithium ion battery, said active material having a layered structure represented by the following compositional formula:

$$Li_x(Ni_yM_{1-y})O_z$$

in which M is one or more selected from the group consisting of Mn, Co, Mg, Al, Ti, Cr, Fe, Cu and Zr with the proviso that at least Mn is selected, x is within the range of 0.9-1.2, y is within the range of 0.5-0.95 and z is within the range of 1.8-2.4 wherein when A is defined as a value which is obtained by dividing an average of the peak intensities observed at 1420-1450 cm$^{-1}$ and 1470-1500 cm$^{-1}$ by the maximum peak intensity which appears at 520-620 cm$^{-1}$ in an infrared absorption spectrum obtained by FT-IR, A satisfies the following relational formula:

$$0.24y-0.05 \le A \le 0.48y-0.08.$$

TABLE 1

| No. | Comp. ratio NiMn:Co | x | y | z | Li charge Li (g) | Calcined temp. °C. | Retention time hr | Peak ratio A | Init. discharge cap. (mAh/g) | Remarks |
|---|---|---|---|---|---|---|---|---|---|---|
| 1 | 1:1:1 | 1.01 | 0.336 | 2.15 | 1567 | 1000 | 2 | 0.020 | 145.5 | |
| 2 | 1:1:1 | 0.99 | 0.334 | 2.11 | 1557 | 1050 | 1 | 0.015 | 142.3 | Comp. ex. |
| 3 | 1:1:1 | 1.06 | 0.336 | 2.18 | 1583 | 1000 | 2 | 0.035 | 152.0 | |
| 4 | 1:1:1 | 1.70 | 0.332 | 2.20 | 1583 | 1050 | 2 | 0.070 | 148.8 | |
| 5 | 1:1:1 | 1.10 | 0.333 | 2.24 | 1603 | 1050 | 2 | 0.100 | 140.2 | Comp. ex. |
| 6 | 1:1:1 | 1.09 | 0.333 | 2.22 | 1593 | 1050 | 2 | 0.090 | 145.7 | |
| 7 | 1:1:1 | 1.00 | 0.335 | 2.13 | 1557 | 950 | 3 | 0.045 | 154.5 | |
| 8 | 1:1:1 | 1.00 | 0.334 | 2.15 | 1557 | 1000 | 3 | 0.060 | 152.6 | |
| 9 | 60:25:15 | 1.11 | 0.592 | 2.38 | 1603 | 900 | 1 | 0.270 | 163.5 | Comp. ex. |
| 10 | 60:25:15 | 1.03 | 0.592 | 2.22 | 1567 | 950 | 1 | 0.155 | 172.7 | |
| 11 | 60:25:15 | 1.00 | 0.591 | 2.19 | 1557 | 950 | 1 | 0.035 | 163.0 | Comp. ex. |
| 12 | 60:25:15 | 1.09 | 0.590 | 2.35 | 1603 | 900 | 2 | 0.260 | 166.6 | |
| 13 | 60:25:15 | 1.06 | 0.599 | 2.34 | 1593 | 900 | 2 | 0.200 | 171.6 | |
| 14 | 60:25:15 | 1.04 | 0.598 | 2.30 | 1583 | 900 | 2 | 0.170 | 173.2 | |
| 15 | 60:25:15 | 1.11 | 0.599 | 2.33 | 1603 | 900 | 3 | 0.220 | 169.3 | |
| 16 | 60:25:15 | 1.08 | 0.598 | 2.31 | 1593 | 900 | 3 | 0.110 | 170.2 | |
| 17 | 60:25:15 | 1.02 | 0.593 | 2.25 | 1572 | 950 | 3 | 0.075 | 165.3 | |
| 18 | 75:15:10 | 0.97 | 0.751 | 2.18 | 1552 | 870 | 2 | 0.090 | 173.0 | Comp. ex. |
| 19 | 75:15:10 | 0.98 | 0.753 | 2.18 | 1557 | 870 | 2 | 0.120 | 176.5 | |
| 20 | 75:15:10 | 1.00 | 0.752 | 2.21 | 1567 | 870 | 2 | 0.130 | 176.6 | |
| 21 | 75:15:10 | 1.02 | 0.752 | 2.26 | 1572 | 850 | 2 | 0.180 | 184.6 | |
| 22 | 75:15:10 | 1.10 | 0.753 | 2.35 | 1593 | 850 | 2 | 0.330 | 173.4 | Comp. ex. |
| 23 | 75:15:10 | 1.07 | 0.749 | 2.30 | 1533 | 850 | 2 | 0.160 | 181.3 | |
| 24 | 75:15:10 | 1.06 | 0.750 | 2.29 | 1573 | 850 | 2 | 0.140 | 180.3 | |
| 25 | 75:15:10 | 1.08 | 0.751 | 2.33 | 1583 | 880 | 2 | 0.250 | 182.8 | |
| 26 | 75:15:10 | 1.11 | 0.749 | 2.38 | 1593 | 880 | 2 | 0.280 | 179.5 | |

Figure 2:
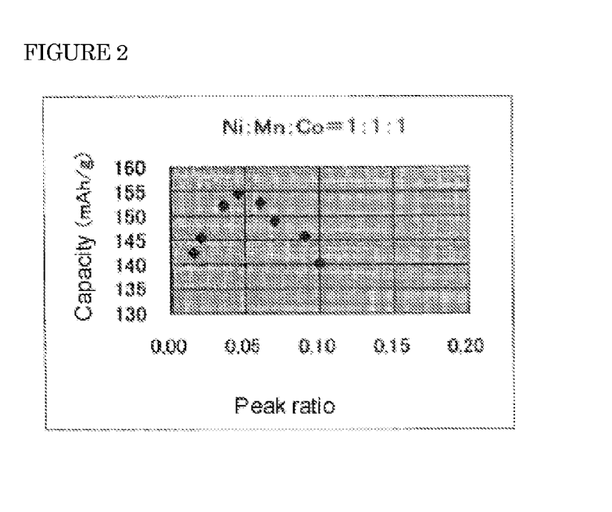
FIG. 2 This is a figure which indicates the relationship between the peak ratio and capacity density of battery, with regard to Example 1-8 in which the compositional ratio is Ni:Mn:Co=1:1:1.
Figure 3:
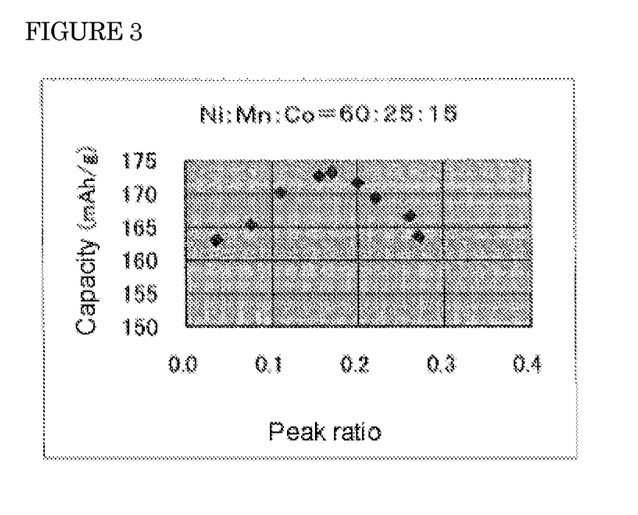
FIG. 3 This is a figure which indicates the relationship between the peak ratio and capacity density of battery, with regard to Example 9-17 in which the compositional ratio is Ni:Mn:Co=60:25:15.
Figure 4:
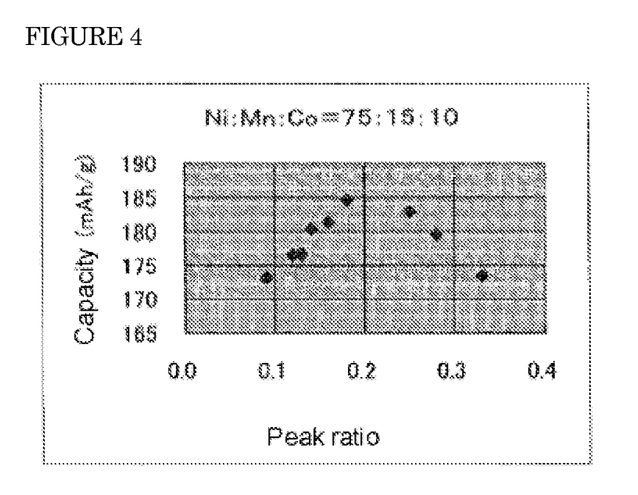
FIG. 4 This is a figure which indicates the relationship between the peak ratio and capacity density of battery, with regard to Example 18-26 in which the compositional ratio is Ni:Mn:Co=75:15:10.

From the results shown in Table 1, relationship between the peak ratio and discharge capacity density for each composition is as follows:

(1) Ni:Mn:Co=1:1:1 composition (see FIG. 2)
At peak ratio of 0.02-0.09, 145 mAh/g or more
At peak ratio of 0.03-0.07, 150 mAh/g or more
(2) Ni:Mn:Co=60:25:15 composition (see FIG. 3)
At peak ratio of 0.08-0.25, 165 mAh/g or more
At peak ratio of 0.10-0.21, 170 mAh/g or more
(3) Ni:Mn:Co=75:15:10 composition (FIG. 4)
At peak ratio of 0.10-0.30, 175 mAh/g or more
At peak ratio of 0.13-0.27, 145 mAh/g or more 2. The positive electrode active material for a lithium ion battery according to claim 1, wherein M is two of Mn and Co.

3. A positive electrode for a lithium ion battery comprising the positive electrode active material for a lithium ion battery according to claim 1 or 2.

4. A lithium ion battery comprising the positive electrode for a lithium ion battery according to claim 3.

5. A method for evaluating a positive electrode active material for a lithium ion battery, said active material having a layered structure represented by the following compositional formula: $Li_x(Ni_yM_{1-y})O_z$ in which M is one or more selected from the group consisting of Mn, Co, Mg, Al, Ti, Cr, Fe, Cu and Zr with the proviso that at least Mn is selected, x is within the range of 0.9-1.2, y is within the range of 0.5-0.95 and z is within the range of 1.8-2.4 wherein when A is defined as a value which is obtained by dividing an average of the peak intensities observed at 1420-1450 $cm^{-1}$ and 1470-1500 $cm^{-1}$ by the maximum peak intensity which appears at 520-620 $cm^{-1}$ in an infrared absorption spectrum obtained by FT-IR, wherein the method comprises determining whether A satisfies the relational formula: $0.24y-0.05 \leq A \leq 0.48y-0.08$ or not.

* * * * *